C. J. CURTIS.
EXPOSURE METER.
APPLICATION FILED MAR. 1, 1915.
1,176,349.
Patented Mar. 21, 1916.
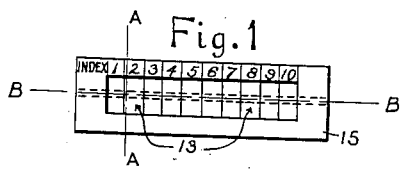
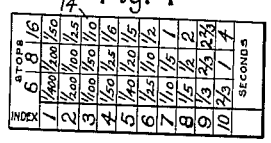
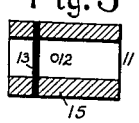
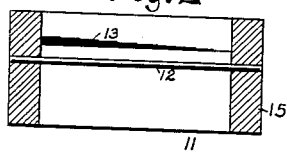
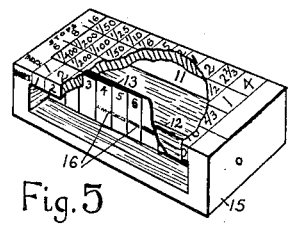
Witnesses
Inventor
Clifton J. Curtis:
per Myron M. Davis
Attorney

UNITED STATES PATENT OFFICE.

CLIFTON J. CURTIS, OF PORTLAND, MAINE.

EXPOSURE-METER.

1,176,349.  Specification of Letters Patent.  Patented Mar. 21, 1916.

Application filed March 1, 1915. Serial No. 11,170.

*To all whom it may concern:*

Be it known that I, CLIFTON J. CURTIS, a citizen of the United States, and a resident of Portland, in the county of Cumberland and State of Maine, have invented a new and Improved Exposure-Meter, of which the following is a full, clear, and exact description.

My invention relates to exposure meters and especially to those adapted for use in photography to measure the intensity of the light.

Exposure meters are commonly employed in photography to aid in determining the length of exposure necessary in order to secure a negative of good quality under any particular conditions of light or weather, and for any character of object. Without their use, this determination becomes a matter of guess work and many spoiled negatives result. Such meters commonly employ light sensitive paper of known characteristics or else are constructed with moving parts with the result that they are expensive to construct and inconvenient to operate.

I have, therefore, sought to overcome these difficulties and the object of my invention is to provide an improved exposure meter of simple construction, which shall be inexpensive, efficient, easily manipulated, and devoid of moving parts.

The details of construction and mode of operation of my device will be more readily understood by reference to the accompanying drawing, in which:

Figure 1 is a side view of my meter, Fig. 2 is a horizontal section on the line B—B of Fig. 1, Fig. 3 is a vertical section on the line A—A of Fig. 1, Fig. 4 is a plan view looking at the top of the meter shown in Fig. 1, Fig. 5 is a perspective view with a portion broken away to show the interior construction.

A hollow casing 15, which may be constructed of any suitable material and in any desired shape, forms the framework of my meter and is here shown as made in rectangular form and provided with openings in opposite walls which are co-extensive with the corresponding faces of the casing. It is only essential, however, that this casing shall serve as a light-directing means, whereby the light reflected from the object to be photographed is directed to the eye, and any well known means of accomplishing this result may be used. Extending transversely of this casing and held in place in any convenient manner is a translucent light-measuring screen 13 of varying thickness. This screen is preferably arranged so as to be substantially perpendicular to the light rays passing through the casing, and hence, in the form illustrated, perpendicular to the line of the openings in said casing. In practice, I find it convenient to construct this screen out of a plurality of layers of translucent material, each layer having a different area. One inexpensive and suitable material is the tracing cloth used by draftsmen and it may be arranged in overlapping layers which, of themselves present lines of demarcation serving as an index to the thickness at any point. This screen may be protected on either side by a covering of transparent celluloid. In combination with this screen and casing, I also provide means for producing an image thereon which shall serve as a guide to the eye in determining the extent to which light is transmitted through the screen. One very simple and efficient form of such a means is the opaque member 12, preferably constructed of wire. This member is placed a short distance away from the screen on the side toward the incoming light rays. Index numbers are provided which refer to the various thicknesses of the screen 13 and these are placed upon the casing 15 or upon the screen itself. A reference table 14 is then provided showing the correct exposure corresponding to each index number and for various stops or diaphragm openings. For convenience the table 14 may be displayed upon the casing 15, as shown in Figs. 4 and 5.

In using my improved exposure meter, the operator holds the device nearly at arm's length with the opening 11 away from the eye and directed toward the object to be photographed. The light reflected from the object passes through the opening 11 of the light-directing casing and is transmitted through a portion of the light-measuring screen 13. Some means, such as the opaque member 12, causes the light to produce an image 16 on the screen. In the form shown the rays are intercepted and the image consists of a shadow. By noting the index figure opposite the end of the shadow, the operator is enabled to readily determine the extent to which light is transmitted through the screen. The correct exposure for the then present conditions of light and weather is ascertained from the table 14 and the operation is completed. I have, therefore, described in detail one embodiment of my invention by which the object sought may be obtained and while my invention extends to the exact details shown and described, I wish it understood that I am not limited thereto but seek to cover in the appended claim all those variations and modifications which come within the true scope and spirit of my invention.

Having thus described my invention, what I claim as new and desire to secure by Letters Patent of the United States is:—

An exposure meter comprising a casing open at opposite ends, a screen extending transversely of said casing, said screen being constructed of overlapping layers of translucent material, each layer having a different area, and a narrow opaque body arranged transversely of said casing so as to cast a shadow on each thickness of said screen.

In testimony whereof I have signed my name to this specification in the presence of two subscribing witnesses.

CLIFTON J. CURTIS.

Witnesses:
WILLIAM L. HARDY,
LEON C. SPEAR.